United States Patent [19]

Hatano et al.

[11] Patent Number: 5,243,458
[45] Date of Patent: Sep. 7, 1993

[54] ANTIREFLECTION COATING FOR INFRARED LIGHT

[75] Inventors: Takuji Hatano, Sakai; Mariko Fukumoto, Osaka, both of Japan

[73] Assignee: Minolta Camera Kabushiki Kaisha, Osaka, Japan

[21] Appl. No.: 811,818

[22] Filed: Dec. 20, 1991

[30] Foreign Application Priority Data

Dec. 25, 1990 [JP] Japan .................. 2-405699

[51] Int. Cl.$^5$ .................. G02B 1/10; G02B 5/28
[52] U.S. Cl. .................. 359/359; 359/586; 359/588; 359/589
[58] Field of Search .............. 359/359, 360, 580, 586, 359/588, 589

[56] References Cited

U.S. PATENT DOCUMENTS

| 3,468,594 | 9/1969 | Vogl et al. | |
| 4,322,124 | 3/1982 | Padgitt et al. | |
| 4,498,728 | 2/1985 | Thoni et al. | 359/359 |
| 4,533,593 | 8/1985 | Miyata et al. | 359/359 |
| 4,568,140 | 2/1986 | van der Werf et al. | 359/359 |
| 4,578,527 | 3/1986 | Rancourt et al. | 359/359 |
| 4,778,731 | 10/1988 | Kraatz et al. | 359/359 |
| 4,997,241 | 3/1991 | Muratomi | 359/359 |
| 5,091,244 | 2/1992 | Biornard | 359/359 |

FOREIGN PATENT DOCUMENTS

| 58-28708 | 2/1983 | Japan . |
| 64-15703 | 1/1989 | Japan . |
| 1-255801 | 10/1989 | Japan . |
| 1-267501 | 10/1989 | Japan . |
| 2-11121 | 3/1990 | Japan . |
| 2-13761 | 4/1990 | Japan . |
| 2-135401 | 5/1990 | Japan . |
| 2-228691 | 9/1990 | Japan . |

Primary Examiner—Martin Lerner
Attorney, Agent, or Firm—Price, Gess & Ubell

[57] ABSTRACT

An antireflection coating which comprises a substrate and a multilayered coating is provided. The substrate is made of silicon (Si) or germanium (Ge). The multilayered coating is formed on the substrate and consists of a plurality of layers. In the multilayered coating, a layer of silicon dioxide ($SiO_2$) of a predetermined thickness is contiguously formed to the substrate.

16 Claims, 9 Drawing Sheets

ANTIREFLECTION COATING FOR INFRARED LIGHT

BACKGROUND OF THE INVENTION

1. Field of the Invention

The present invention relates to an antireflection coating for infrared light which can be formed on silicon or germanium substrates.

2. Description of Related Art

Infrared light in a specific wavelength range of 3 to 5 $\mu$m, which is a wavelength range that is rarely absorbed by the atmosphere, is used for various devices such as an infrared camera, an infrared detector, and an infrared light measuring device. The kinds of materials which can transmit the above-mentioned infrared light is considerably less than those materials which can transmit visible light. Therefore, an optical element, such as a lens, which is formed from a silicon or germanium substrate, is generally used for the above-mentioned devices. However, silicon and germanium have high refractive indices, so that problems can occur in that the resulting reflectance on a surface of the substrate is high (silicon: approximately 30%, germanium: approximately 36%), and the corresponding transmittance therethrough is low. Accordingly, for achieving a higher transmittance and for preventing any ghost and a flare from occurring in a lens system, it is indispensable to form an antireflection coating on the surface.

As such, an antireflection coating in which a layer of zinc sulfide (ZnS) is contiguously formed on a substrate is known (for example, Japanese Laid-Open Patent Application No. Sho. 64-15703, Japanese Laid-Open Patent Application No. Hei. 2-135401, Japanese Examined Patent Publication No. Hei 2-11121, and Japanese Examined Patent Publication No. Hei. 2-13761).

However, zinc sulfide (ZnS) has a relatively bad adhesion to the substrate, so that the layer of zinc sulfide (ZnS) can easily be removed. Thus, there is a problem in that conventional antireflection coatings will be lacking in endurance and can be stripped from the substrate.

SUMMARY OF THE INVENTION

An object of the present invention is to provide an antireflection coating which is formed on a silicon or germanium substrate used as a substrate of optical parts for infrared light in the wavelength range of 3 to 5 $\mu$m, and which has a good antireflection characteristic and endurance.

Conventionally, when an antireflection coating is formed on a silicon or germanium substrate, a layer of zinc sulfide (ZnS) is formed contiguously to the substrate. The above-mentioned object is achieved in the present invention by forming a layer of silicon dioxide (SiO$_2$) instead of the layer of zinc sulfide (ZnS).

The present invention relates to an anti-reflection coating for a silicon or a germanium substrate, which comprises a multilayered coating including a layer of silicon dioxide (SiO$_2$) formed contiguously to the substrate.

An antireflection coating having a layer of silicon dioxide (SiO$_2$) which is formed contiguously to the silicon or germanium substrate has a good optical characteristic and good endurance.

DESCRIPTION OF THE PREFERRED EMBODIMENTS

Silicon dioxide, which is formed as the N-th layer (counted from the air side) on the silicon or germanium substrate, will actually absorb a certain percentage of infrared light in the wavelength range of 3 to 5 $\mu$m. So, it has not conventionally been used as a material for comprising an antireflection coating within this wavelength range. However, in the present invention, the predetermined thickness of the silicon dioxide (SiO$_2$) layer selected is so slight that any bad influence to an optical characteristic by its absorption can be ignored. The thickness of the layer of silicon dioxide (SiO$_2$), however, still has good adhesion to both silicon and germanium substrates and to a contiguous layer of germanium (Ge). Therefore, the layer of silicon dioxide (SiO$_2$) can contribute to an improvement of endurance of the coating much more than it would adversely influence the optical characteristic.

Figure 1:
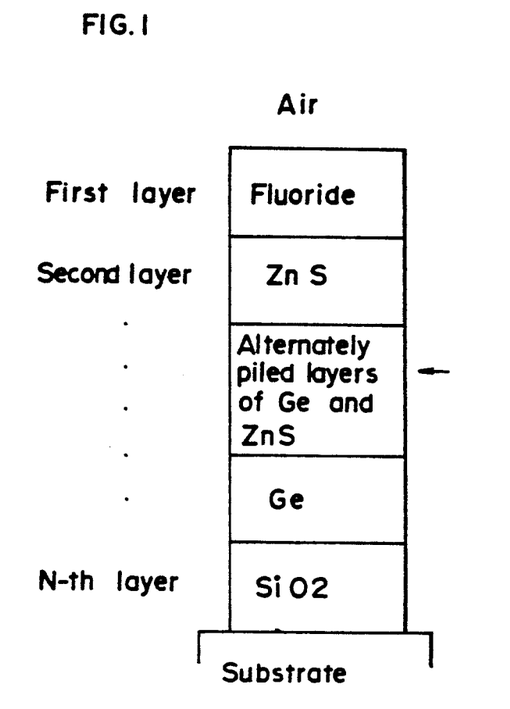
FIG. 1 is a sectional view of a basic structure of an antireflection coating formed on a silicon or germanium substrate in the present invention.

A basic structure of an antireflection coating of the present invention is shown in FIG. 1. In the present invention, from the air side, the first layer, the second layer, ... and the N-th layer are all formed above a substrate made of silicon or germanium so that the N-th layer can be formed contiguously to the silicon or germanium substrate. The first layer is made of fluoride, the second layer is made of zinc sulfide (ZnS), the third layer is made of germanium (Ge), and from the fourth layer, a layer of zinc sulfide (ZnS), and a layer of germanium (Ge) are formed alternately. The [N−1]th layer is made of germanium (Ge) and the Nth layer is made of silicon dioxide (SiO$_2$).

In the basic structure of an antireflection coating of the present invention, a layer of a material having a tensile stress (fluoride or germanium) and a layer of a material having a compressive stress (zinc sulfide) are piled alternately. Therefore, the two stresses are compensated to lessen each other, and further, these two materials have good adhesion, so that the resultant layers are hard to split. Generally, an antireflection coating is comprised of piled layers of materials having, respectively, a different refractive index. By carefully adjusting the thickness and the refractive index, and antireflection effect can be obtained. The number of the piled layers can be subjectively determined by the optical designer. But too many piled layers make the coating thick and, as a result, not only is the transmittance lowered, but also, the piled layers may become easy to split. Especially, since the thickness of the layer is determined on the basis of the wavelength of the infrared light (whose wavelength is in a range of 3 to 5 μm), the above-described tendency will be strengthened. From this aspect, it is best for an antireflection coating formed on a silicon or germanium substrate to be comprised of about four layers.

The present invention is described further in detail with an example of an antireflecting coating comprised of four piled layers hereinafter.

The first layer is made of fluoride and has a refractive index (n$_1$) of 1.25 to 1.60. As the first layer, the following fluoride can be applied: yttrium fluoride (YF$_3$), magnesium fluoride (MgF$_2$), aluminum fluoride (AlF$_3$), lithium fluoride (LiF$_2$), barium fluoride (BaF$_2$), calcium fluoride (CaF$_2$), lanthanum fluoride (LaF$_3$), sodium fluoride (NaF), aluminum sodium fluoride (Na$_3$AlF$_6$), and so on.

The second layer is formed under the first layer and made of zinc sulfide (ZnS) having a refractive index less than that of the first layer.

The third layer is formed under the second layer and made of germanium (Ge) having a refractive index greater than that of the second layer.

The fourth layer is formed under the third layer and made of silicon dioxide (SiO$_2$) having a refractive index less than that of the third layer.

The first to the fourth layers can be formed by vacuum evaporation, sputtering, or CVD, and the refractive index of each layer can be adjusted by changing the forming condition (for example, vacuum degree or heating temperature).

The optical thickness of each layer is formed within the range as follows:

| | |
|---|---|
| When a silicon substrate is used, | |
| the first layer | $0.21 \lambda \leq n_1 d_1 \leq 0.27 \lambda$ |
| the second layer | $0.12 \lambda \leq n_2 d_2 \leq 0.29 \lambda$ |
| the third layer | $0.02 \lambda \leq n_3 d_3 \leq 0.10 \lambda$ |
| the fourth layer | $0.02 \lambda \leq n_4 d_4 \leq 0.04 \lambda$ |
| When a germanium substrate is used, | |
| the first layer | $0.19 \lambda \leq n_1 d_1 \leq 0.26 \lambda$ |
| the second layer | $0.13 \lambda \leq n_2 d_2 \leq 0.28 \lambda$ |
| the third layer | $0.02 \lambda \leq n_3 d_3 \leq 0.11 \lambda$ |
| the fourth layer | $0.02 \lambda \leq n_4 d_4 \leq 0.03 \lambda$ |
| wherein λ is a design wavelength. | |

When the optical thickness of each layer is formed to be out of the above-mentioned range, the expected antireflection effect cannot be obtained.

In the case of forming the first layer out of fluoride whose refractive index (n$_1$) is from 1.35 up, it is suitable to form the optical thickness of the first layer approximately 0.25λ and to form the total optical thickness of the second, third, and fourth layers approximately 0.25λ.

In the case of forming the first layer out of fluoride whose refractive index (n$_1$) is not exceeding 1.45, it is suitable to form the respective optical thicknesses of the first and second layers approximately 0.25λ and to form the total optical thickness of the third and fourth layers approximately 0.10λ.

The layer of silicon dioxide is selected to be of a predetermined optical thickness sufficient to improve adhesion of subsequent coating layers without significantly adsorbing the design wavelength of infrared radiation. A ratio of the optical thickness of the layer of silicon dioxide to the final effective coating layer in the antireflecting coating design is within the following range:

$$5.5 \lesssim \frac{nd \text{ (air layer)}}{nd \text{ (SiO}_2 \text{ layer)}} \lesssim 11$$

The present invention is further described with specifications of embodiments hereinafter.

Tables 1 to 4 show structures of antireflection coatings formed on germanium or silicon substrates, according to the embodiments 1 to 4 of the present invention, respectively.

Tables 5 to 13 show structures of antireflection coatings in which the second to the fourth layers are the same as the structure in the embodiments 1 to 4, and the thickness and the refractive index of the first layer are variably changed, according to the embodiments 5 to 13 of the present invention, respectively.

Tables 14 to 17 (the comparative examples 1 to show structures of antireflection coatings which are formed on germanium or silicon substrates and in which the fourth layer is made not of silicon dioxide (SiO$_2$), but zinc sulfide (ZnS). The comparative examples 1 to 4 are for comparison of the endurance with the embodiments 1 to 4.

The reflectance characteristic of the embodiments 1 to 13 and the comparative examples 1 to 4 are shown in FIGS. 2 to 18, respectively.

TABLE 1

(embodiment 1)
Design wavelength ($\lambda$) = 3.8 μm, Incident angle ($\sigma$) = 0°

| | Material | Refractive index (n) | Optical thickness of layer (nd/$\lambda$) |
|---|---|---|---|
| Incident medium | Air | 1.00 | |
| First layer | Yttrium fluoride (YF$_3$) | 1.50 | 0.205 |
| Second layer | Zinc sulfide (Zns) | 2.25 | 0.160 |
| Third layer | Germanium (Ge) | 4.30 | 0.046 |
| Fourth layer | Silicon dioxide (SiO$_2$) | 1.45 | 0.030 |
| Substrate | Silicon (Si) | 3.43 | |

Figure 2:
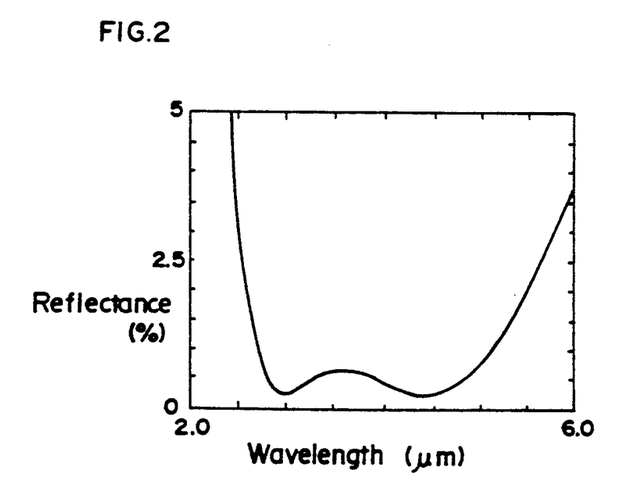
FIG. 2 is a graph showing a reflectance characteristic of an antireflection coating of the embodiment 1 to the infrared light in the wavelength range of 3 to 5 $\mu$m.

The reflectance characteristic of this embodiment is shown in FIG. 2.

TABLE 2

(embodiment 2)
Design wavelength ($\lambda$) = 3.8 μm, Incident angle ($\sigma$) = 0°

| | Material | Refractive index (n) | Optical thickness of layer (nd/$\lambda$) |
|---|---|---|---|
| Incident medium | Air | 1.00 | |
| First layer | Magnesium fluoride (MgF$_2$) | 1.35 | 0.230 |
| Second layer | Zinc sulfide (Zns) | 2.25 | 0.188 |
| Third layer | Germanium (Ge) | 4.30 | 0.021 |
| Fourth layer | Silicon dioxide (SiO$_2$) | 1.45 | 0.030 |
| Substrate | Silicon (Si) | 3.43 | |

Figure 3:
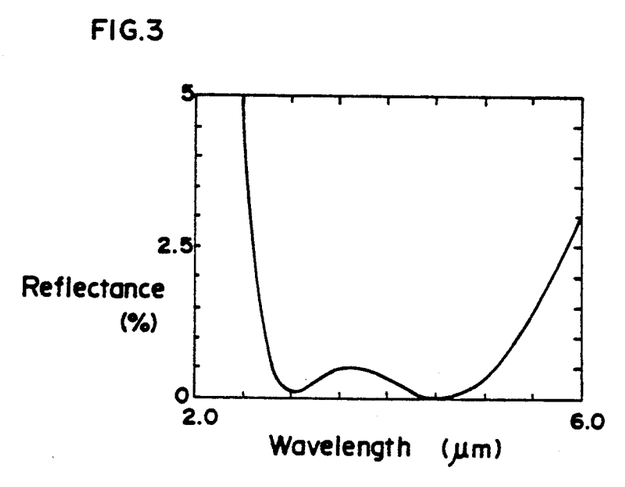
FIG. 3 is a graph showing a reflectance characteristic of an antireflection coating of the embodiment 2 to the infrared light in the wavelength range of 3 to 5 $\mu$m.

The reflectance characteristics of this embodiment is shown in FIG. 3.

TABLE 3

(embodiment 3)
Design wavelength ($\lambda$) = 3.8 μm, Incident angle ($\sigma$) = 0°

| | Material | Refractive index (n) | Optical thickness of layer (nd/$\lambda$) |
|---|---|---|---|
| Incident medium | Air | 1.00 | |
| First layer | Yttrium fluoride (YF$_3$) | 1.50 | 0.198 |
| Second layer | Zinc sulfide (Zns) | 2.25 | 0.150 |
| Third layer | Germanium (Ge) | 4.30 | 0.067 |
| Fourth layer | Silicon dioxide (SiO$_2$) | 1.45 | 0.030 |
| Substrate | Germanium (Ge) | 4.03 | |

Figure 4:
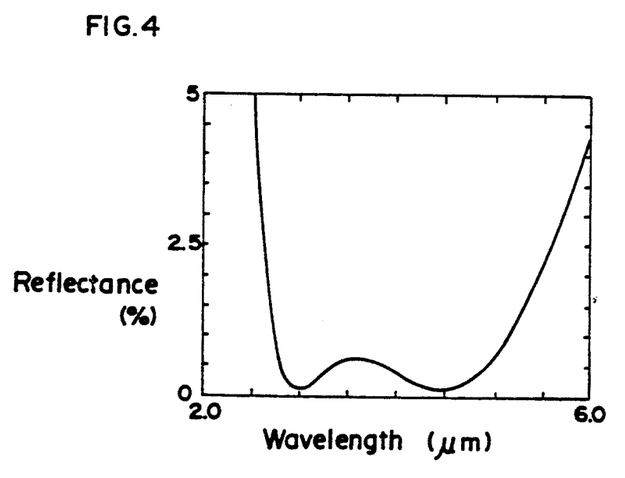
FIG. 4 is a graph showing a reflectance characteristic of an antireflection coating of the embodiment 3 to the infrared light in the wavelength range of 3 to 5 $\mu$m.

The reflectance characteristic of this embodiment is shown in FIG. 4.

TABLE 4

(embodiment 41)
Design wavelength ($\lambda$) = 3.8 μm, Incident angle ($\sigma$) = 0°

| | Material | Refractive index (n) | Optical thickness of layer (nd/$\lambda$) |
|---|---|---|---|
| Incident medium | Air | 1.00 | |
| First layer | Magnesium fluoride (MgF$_2$) | 1.35 | 0.230 |
| Second layer | Zinc sulfide (Zns) | 2.25 | 0.180 |

TABLE 4-continued (embodiment 41)
Design wavelength ($\lambda$) = 3.8 μm, Incident angle ($\sigma$) = 0°

| | Material | Refractive index (n) | Optical thickness of layer (nd/$\lambda$) |
|---|---|---|---|
| Third layer | Germanium (Ge) | 4.30 | 0.045 |
| Fourth layer | Silicon dioxide (SiO$_2$) | 1.45 | 0.030 |
| Substrate | Germanium (Ge) | 4.03 | |

Figure 5:
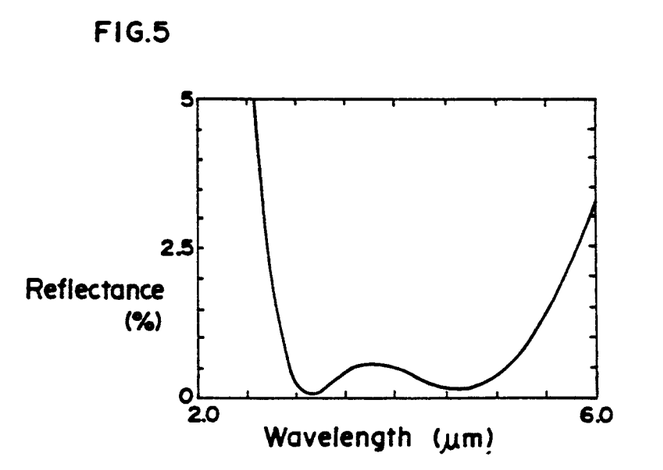
FIG. 5 is a graph showing a reflectance characteristic of an antireflection coating of the embodiment 4 to the infrared light in the wavelength range of 3 to 5 $\mu$m.

The reflectance characteristic of this embodiment is shown in FIG. 5.

TABLE 5

(embodiment 5)
Design Wavelength ($\lambda$ = 3.8 μm, Incident angle ($\alpha$) = 0°

| | Material | Refractive index (n) | Optical thickness of layer n ($\lambda$) |
|---|---|---|---|
| Incident medium | Air | 1.00 | |
| First layer | Yttrium fluoride (YF$_3$) | 1.25 | 0.260 |
| Second layer | Zinc sulfide (Zns) | 2.25 | 0.280 |
| Third layer | Germanium (Ge) | 4.30 | 0.086 |
| Fourth layer | Silicon dioxide (SiO$_2$) | 1.45 | 0.030 |
| Substrate | Silicon (Si) | 3.43 | |

Figure 6:
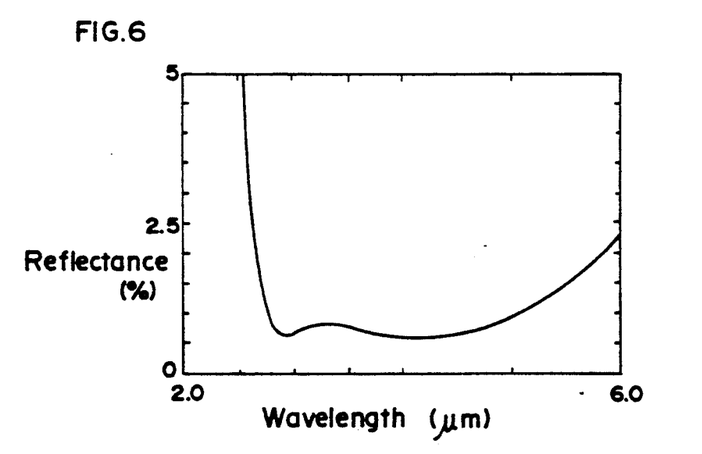
FIG. 6 is a graph showing a reflectance characteristic of an antireflection coating of the embodiment 5 to the infrared light in the wavelength range of 3 to 5 $\mu$m.

The reflectance characteristics of this embodiment is shown in FIG. 6.

TABLE 6

(embodiment 61)
Design wavelength ($\lambda$) = 3.8 μm, Incident angle ($\sigma$) = 0°

| | Material | Refractive index (n) | Optical thickness of layer (nd/$\lambda$) |
|---|---|---|---|
| Incident medium | Air | 1.00 | |
| First layer | Aluminum fluoride (AlF$_3$) | 1.30 | 0.268 |
| Second layer | Zinc sulfide (Zns) | 2.25 | 0.290 |
| Third layer | Germanium (Ge) | 4.30 | 0.094 |
| Fourth layer | Silicon dioxide (SiO$_2$) | 1.45 | 0.030 |
| Substrate | Silicon (Si) | 3.43 | |

Figure 7:
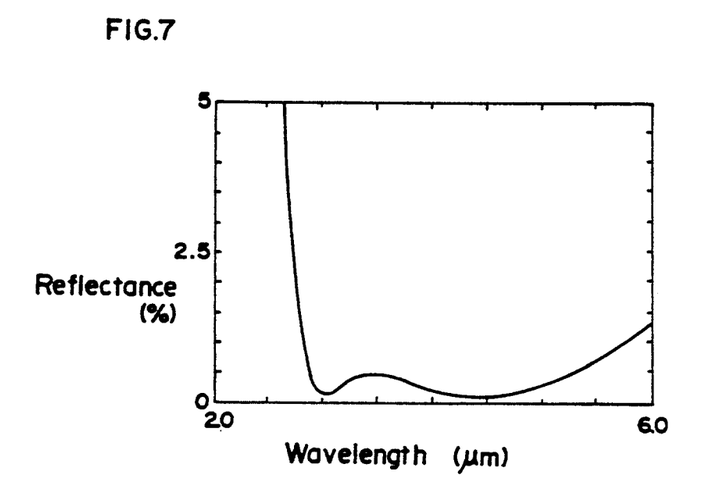
FIG. 7 is a graph showing a reflectance characteristic of an antireflection coating of the embodiment 6 to the infrared light in the wavelength range of 3 to 5 $\mu$m.

The reflectance characteristic of this embodiment is shown in FIG. 7.

TABLE 7

(embodiment 7)
Design wavelength ($\lambda$) = 3.8 μm, Incident angle ($\sigma$) = 0°

| | Material | Refractive index (n) | Optical thickness of layer (nd/$\lambda$) |
|---|---|---|---|
| Incident medium | Air | 1.00 | |
| First layer | Calcium fluoride (CaF$_3$) | 1.40 | 0.247 |
| Second layer | Zinc sulfide (Zns) | 2.25 | 0.280 |
| Third layer | Germanium (Ge) | 4.30 | 0.080 |
| Fourth layer | Silicon dioxide (SiO$_2$) | 1.45 | 0.027 |
| Substrate | Silicon (Si) | 3.43 | |

Figure 8:
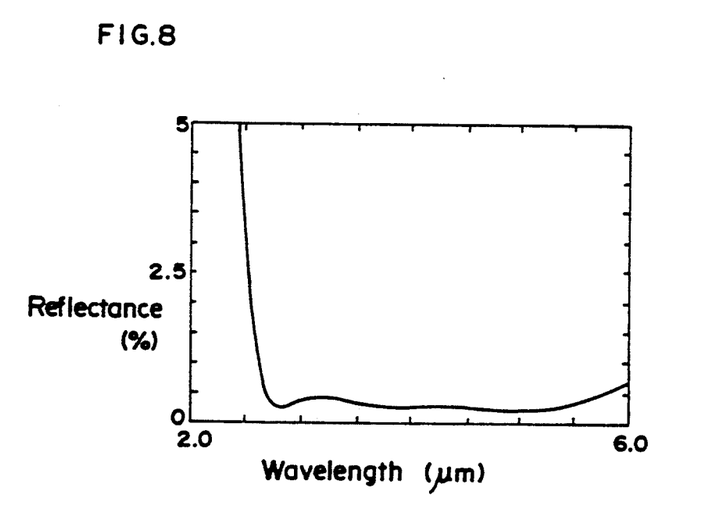
FIG. 8 is a graph showing a reflectance characteristic of an antireflection coating of the embodiment 7 to the infrared light in the wavelength range of 3 to 5 $\mu$m.

The reflectance characteristic of this embodiment is shown in FIG. 8.

TABLE 8

(embodiment 8)
Design wavelength (λ) = 3.8 μm, Incident angle (σ) = 0°

| | Material | Refractive index (n) | Optical thickness of layer (nd/λ) |
|---|---|---|---|
| Incident medium | Air | 1.00 | |
| First layer | Barium fluoride (BaF$_2$) | 1.40 | 0.242 |
| Second layer | Zinc sulfide (Zns) | 2.25 | 0.277 |
| Third layer | Germanium (Ge) | 4.30 | 0.075 |
| Fourth layer | Silicon dioxide (SiO$_2$) | 1.45 | 0.028 |
| Substrate | Silicon (Si) | 3.43 | |

Figure 9:
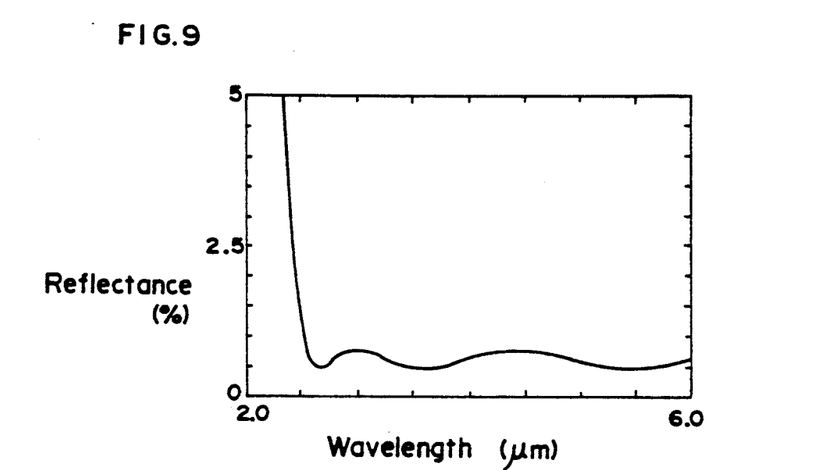
FIG. 9 is a graph showing a reflectance characteristic of an antireflection coating of the embodiment 8 to the infrared light in the wavelength range of 3 to 5 $\mu$m.

The reflectance characteristic of this embodiment is shown in FIG. 9.

TABLE 9

(embodiment 9)
Design wavelength (λ) = 3.8 μm, Incident angle (σ) = 0°

| | Material | Refractive index (n) | Optical thickness of layer (nd/λ) |
|---|---|---|---|
| Incident medium | Air | 1.00 | |
| First layer | Lanthanum fluoride (LaF$_3$) | 1.60 | 0.217 |
| Second layer | Zinc sulfide (Zns) | 2.25 | 0.120 |
| Third layer | Germanium (Ge) | 4.30 | 0.054 |
| Fourth layer | Silicon dioxide (SiO$_2$) | 1.45 | 0.036 |
| Substrate | Silicon (Si) | 3.43 | |

Figure 10:
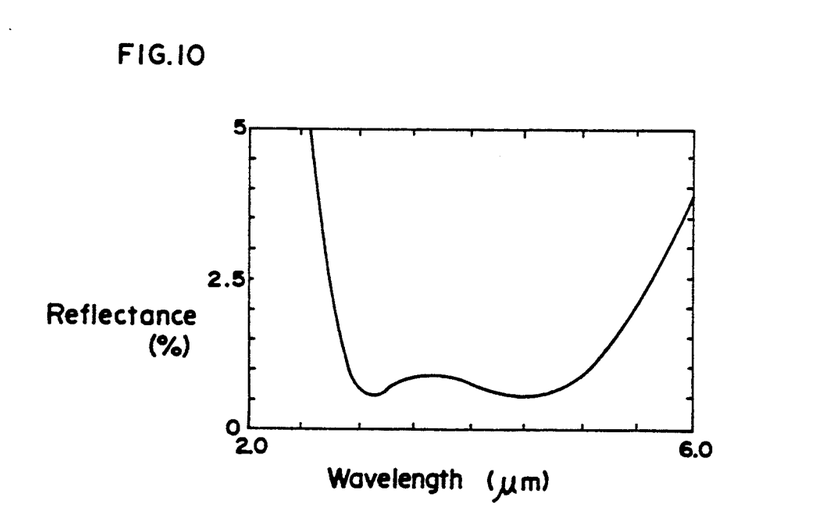
FIG. 10 is a graph showing a reflectance characteristic of an antireflection coating of the embodiment 9 to the infrared light in the wavelength range of 3 to 5 $\mu$m.

The reflectance characteristic of this embodiment is shown in FIG. 10.

TABLE 10

(embodiment 10)
Design Wavelength (λ) = 3.8 ″m, Incident angle (α) = 0°

| | Material | Refractive index (n) | Optical thickness of layer nd (λ) |
|---|---|---|---|
| Incident medium | Air | 1.00 | |
| First layer | Aluminum fluoride (AlF$_3$) | 1.25 | 0.251 |
| Second layer | Zinc sulfide (Zns) | 2.25 | 0.273 |
| Third layer | Germanium (Ge) | 4.30 | 0.106 |
| Fourth layer | Silicon dioxide (SiO$_2$) | 1.45 | 0.027 |
| Substrate | Germanium (Ge) | 4.03 | |

Figure 11:
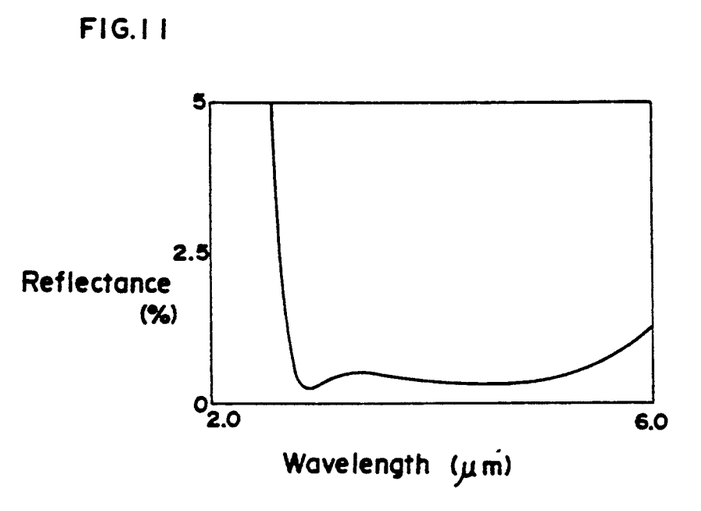
FIG. 11 is a graph showing a reflectance characteristic of an antireflection coating of the embodiment 10 to the infrared light in the wavelength range of 3 to 5 $\mu$m.

The reflectance characteristic of this embodiment is shown in FIG. 11.

TABLE 11

(embodiment 11)
Design wavelength (λ) = 3.8 μm, Incident angle (σ) = 0°

| | Material | Refractive index (n) | Optical thickness of layer (nd/λ) |
|---|---|---|---|
| Incident medium | Air | 1.00 | |
| First layer | Magnesium fluoride (MgF$_2$) | 1.35 | 0.230 |
| Second layer | Zinc sulfide (Zns) | 2.25 | 0.250 |
| Third layer | Germanium (Ge) | 4.30 | 0.100 |
| Fourth layer | Silicon dioxide (SiO$_2$) | 1.45 | 0.022 |
| Substrate | Germanium (Ge) | 4.03 | |

Figure 12:
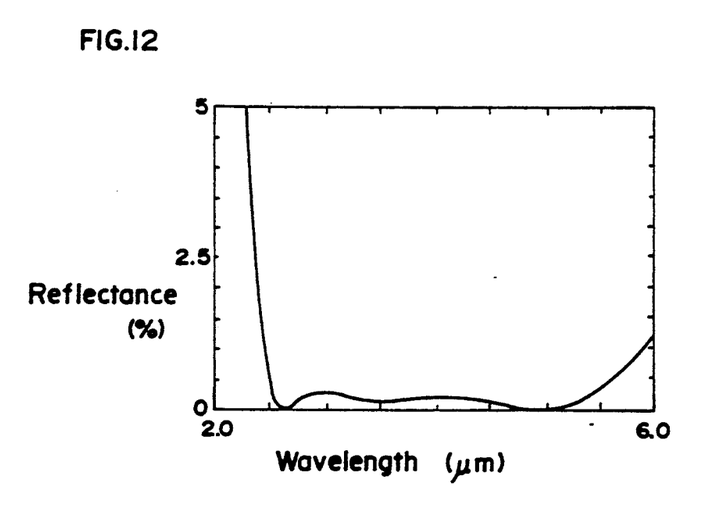
FIG. 12 is a graph showing a reflectance characteristic of an antireflection coating of the embodiment 11 to the infrared light in the wavelength range of 3 to 5 $\mu$m.

The reflectance characteristic of this embodiment is shown in FIG. 12.

TABLE 12

(embodiment 12)
Design wavelength (λ) = 3.8 μm, Incident angle (σ) = 0°

| | Material | Refractive index (n) | Optical thickness of layer (nd/λ) |
|---|---|---|---|
| Incident medium | Air | 1.00 | |
| First layer | Calcium fluoride (CaF$_2$) | 1.40 | 0.245 |
| Second layer | Zinc sulfide (Zns) | 2.25 | 0.265 |
| Third layer | Germanium (Ge) | 4.30 | 0.099 |
| Fourth layer | Silicon dioxide (SiO$_2$) | 1.45 | 0.025 |
| Substrate | Germanium (Ge) | 4.03 | |

Figure 13:
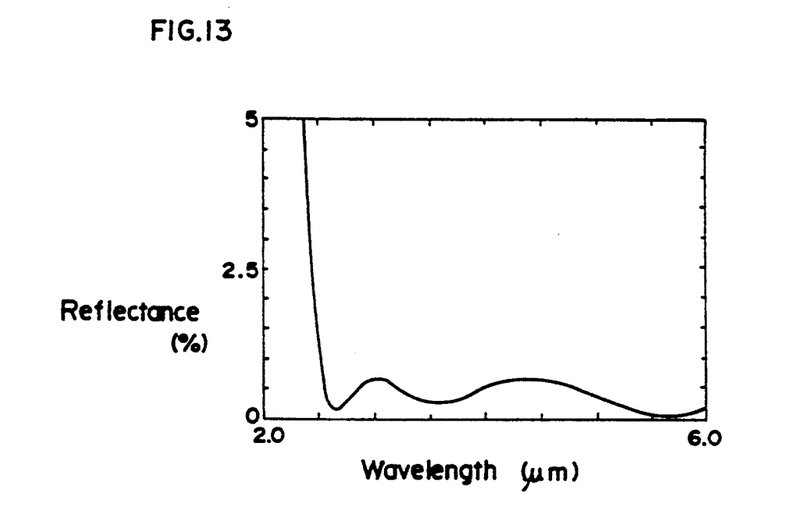
FIG. 13 is a graph showing a reflectance characteristic of an antireflection coating of the embodiment 12 to the infrared light in the wavelength range of 3 to 5 $\mu$m.

The reflectance characteristic of this embodiment is shown in FIG. 13.

TABLE 13

(embodiment 13)
Design wavelength (λ) = 3.8 μm, Incident angle (σ) = 0°

| | Material | Refractive index (n) | Optical thickness of layer (nd/λ) |
|---|---|---|---|
| Incident medium | Air | 1.00 | |
| First layer | Lanthanum fluoride (LaF$_3$) | 1.60 | 0.200 |
| Second layer | Zinc sulfide (Zns) | 2.25 | 0.133 |
| Third layer | Germanium (Ge) | 4.30 | 0.081 |
| Fourth layer | Silicon dioxide (SiO$_2$) | 1.45 | 0.030 |
| Substrate | Germanium (Ge) | 4.03 | |

Figure 14:
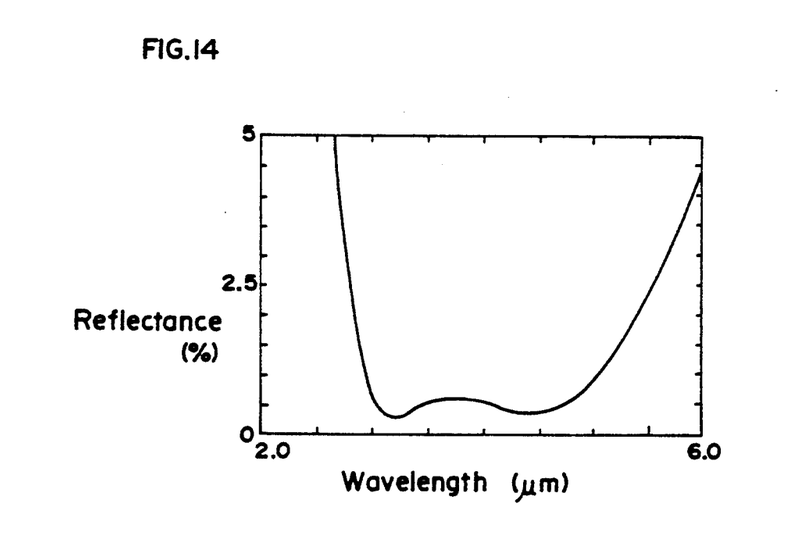
FIG. 14 is a graph showing a reflectance characteristic of an antireflection coating of the embodiment 13 to the infrared light in the wavelength range of 3 to 5 $\mu$m.

The reflectance characteristic of this embodiment is shown in FIG. 14.

TABLE 14

(comparative example 1)
Design wavelength (λ) = 3.8 μm, Incident angle (σ) = 0°

| | Material | Refractive index (n) | Optical thickness of layer (nd/λ) |
|---|---|---|---|
| Incident medium | Air | 1.00 | |
| First layer | Yttrium fluoride (YF$_3$) | 1.50 | 0.229 |
| Second layer | Zinc sulfide (Zns) | 2.25 | 0.112 |
| Third layer | Germanium (Ge) | 4.30 | 0.030 |
| Fourth layer | Zinc sulfide (Zns) | 2.25 | 0.093 |
| Substrate | Silicon (Si) | 3.43 | |

Figure 15:
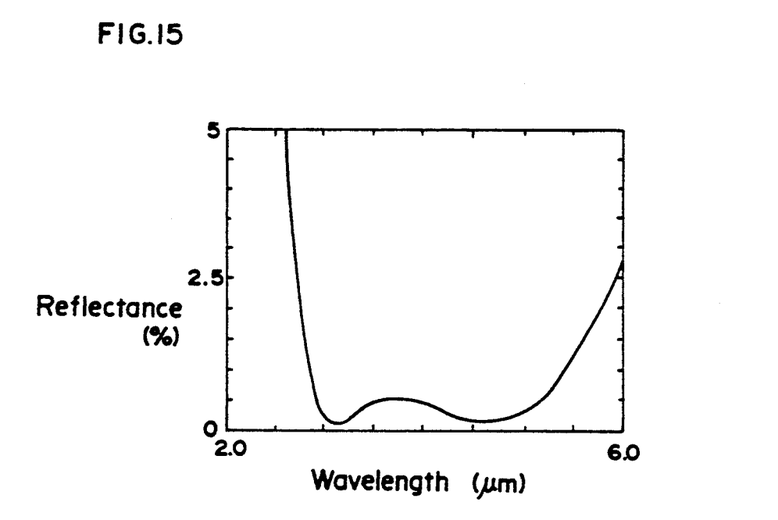
FIG. 15 is a graph showing a reflectance characteristic of an antireflection coating of the comparative embodiment 1 to the infrared light in the wavelength range of 3 to 5 $\mu$m.

The reflectance characteristic of this example is shown in FIG. 15.

TABLE 15

(comparative example 2)
Design wavelength (λ) = 3.8 μm, Incident angle (σ) = 0°

| | Material | Refractive index (n) | Optical thickness of layer (nd/λ) |
| --- | --- | --- | --- |
| Incident medium | Air | 1.00 | |
| First layer | Magnesium fluoride (MgF$_2$) | 1.50 | 0.135 |
| Second layer | Zinc sulfide (Zns) | 2.25 | 0.276 |
| Third layer | Germanium (Ge) | 4.30 | 0.072 |
| Fourth layer | Zinc sulfide (Zns) | 2.25 | 0.049 |
| Substrate | Silicon (Si) | 3.43 | |

Figure 16:
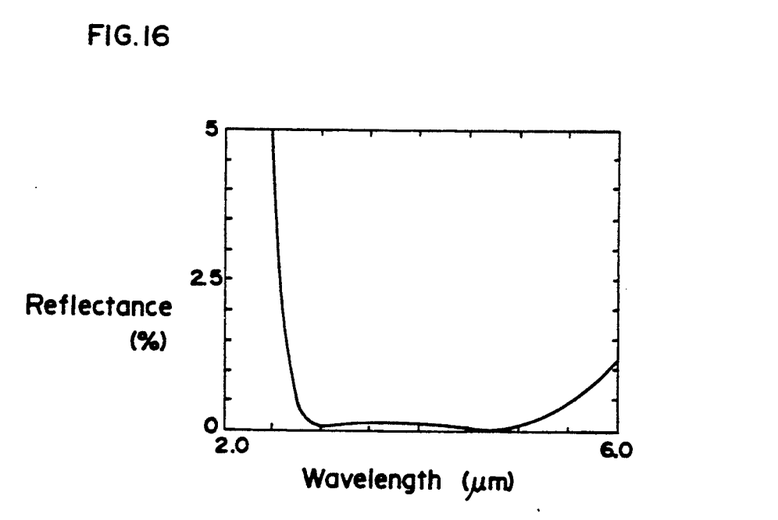
FIG. 16 is a graph showing a reflectance characteristic of an antireflection coating of the comparative embodiment 2 to the infrared light in the wavelength range of 3 to 5 $\mu$m.

The reflectance characteristic of this example is shown in FIG. 16.

TABLE 16

(comparative example 3)
Design wavelength (λ) = 3.8 μm, Incident angle (σ) = 0°

| | Material | Refractive index (n) | Optical thickness of layer (nd/λ) |
| --- | --- | --- | --- |
| Incident medium | Air | 1.00 | |
| First layer | Yttrium fluoride (YF$_3$) | 1.50 | 0.208 |
| Second layer | Zinc sulfide (Zns) | 2.25 | 0.151 |
| Third layer | Germanium (Ge) | 4.30 | 0.058 |
| Fourth layer | Zinc sulfide (ZnS) | 2.25 | 0.063 |
| Substrate | Germanium (Ge) | 4.03 | |

Figure 17:
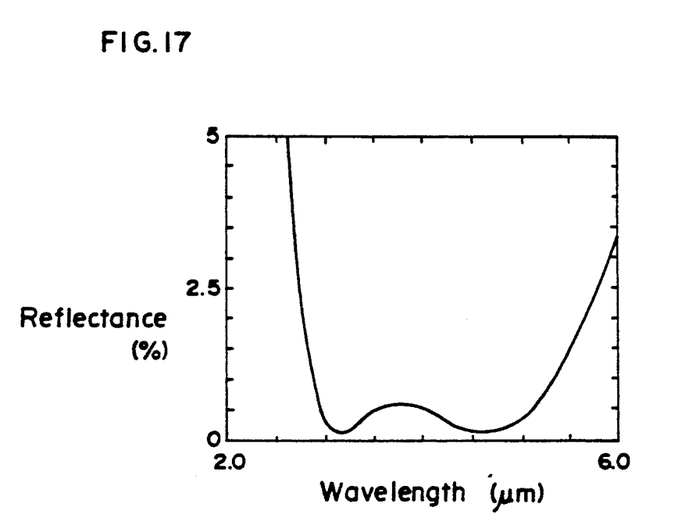
FIG. 17 is a graph showing a reflectance characteristic of an antireflection coating of the comparative embodiment 3 to the infrared light in the wavelength range of 3 to 5 $\mu$m.

The reflectance characteristic of this example is shown in FIG. 17.

TABLE 17

(comparative example 4)
Design wavelength (λ) = 3.8 μm, Incident angle (σ) = 0°

| | Material | Refractive index (n) | Optical thickness of layer (nd/λ) |
| --- | --- | --- | --- |
| Incident medium | Air | 1.00 | |
| First layer | Magnesium fluoride (MgF$_2$) | 1.35 | 0.230 |
| Second layer | Zinc sulfide (Zns) | 2.25 | 0.170 |
| Third layer | Germanium (Ge) | 4.30 | 0.032 |
| Fourth layer | Zinc sulfide (ZnS) | 2.25 | 0.065 |
| Substrate | Germanium (Ge) | 4.03 | |

Figure 18:
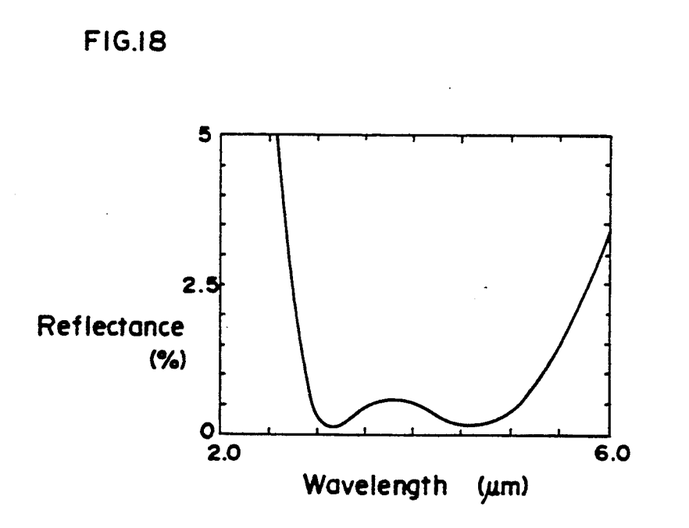
FIG. 18 is a graph showing a reflectance characteristic of an antireflection coating of the comparative embodiment 4 to the infrared light in the wavelength range of 3 to 5 $\mu$m.

The reflectance characteristic of this example is shown in FIG. 18.

Endurance Test

For a reliability test of the antireflection coatings shown in Tables 1 to 4 and 41 to 17, a tape peel test and an organic solvent test has been utilized.

Tape Peel Test

After adhering a tape on a surface of a multilayered coating of an antireflection coating, the tape is peeled perpendicularly off the surface of the multilayered coating. This operation is performed five times.

Organic Solvent test

The surface of a multilayered coating of an antireflection coating is rubbed 40 times with a cloth dipped in alcohol at a 2 kilogram weight pressure.

The result of the above-mentioned tests is shown in Table 18.

TABLE 18

| | Tape test | Organic solvent test |
| --- | --- | --- |
| Embodiment 1 | Good | Good |
| Embodiment 2 | Good | Good |
| Embodiment 3 | Good | Good |
| Embodiment 4 | Good | Good |
| Comparative Example 1 | Partially peeled | Good |
| Comparative Example 2 | Partially peeled | Good |
| Comparative Example 3 | Partially peeled | Good |
| Comparative Example 4 | Partially peeled | Good |

In the antireflecting coatings of the comparative embodiments, the multilayered coatings had been partially peeled off substrates, while in those of the embodiments of the present invention, peeling had not occurred.

Concerning an environmental test (70° C., 80% humidity, leave 24 hours) and a heat cycle test (−20° C. to +85° C.), no abnormality had been recognized.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An antireflection coating for infrared light, comprising:
a substrate made of a material selected from a group consisting of silicon (Si) and germanium (Ge), and
a multilayered interference coating, foamed on said substrate, consisting of a plurality of layers, and including a last layer formed contiguously to said substrate, said last layer being made of silicon dioxide (SiO$_2$);
wherein said multilayered coating fulfills the following conditions:

$0.02\lambda < nd < 0.04\lambda$ wherein:
nd represents an optical thickness of said last silicon dioxide (SiO$_2$) layer; and
λ represents a design wavelength.

2. An antireflection coating as claimed in claim 1, wherein said multilayered coating consists of, from the air side to said substrate side, a first layer made of fluoride, a second layer made of zinc sulfide (ZnS), a third layer made of germanium (Ge), and said last layer.

3. An antireflection coating as claimed in claim 2, wherein said first layer fulfills the following condition:

$1.25 < n_1 < 1.60$ wherein:
n$_1$ represents a refractive index of said first layer.

4. An antireflection coating as claimed in claim 2, wherein said first layer is made of a material selected from a group consisting of yttrium fluoride (YF$_3$), magnesium fluoride (MgF$_2$), aluminum fluoride (AlF$_3$), lithium fluoride (LiF$_2$), barium fluoride (BaF$_2$), calcium fluoride (CaF$_2$), lanthanum fluoride (LaF$_3$), sodium fluoride (NaF), and aluminum sodium fluoride (Na$_3$AlF$_6$).

5. An antireflection coating as claimed in claim 2, wherein said substrate is made of silicon (Si) and said multilayered coating consists of, from the air side, said first layer, a second layer, a third layer, and a fourth layer as the last layer, and said multilayered coating fulfills the following conditions:

$$0.21\lambda < n_1d_1 < 0.27\lambda$$

$$0.12\lambda < n_2d_2 < 0.29\lambda$$

$$0.02\lambda < n_3d_3 < 0.10\lambda$$

$$0.02\lambda < n_4d_4 < 0.04\lambda$$

wherein:
- $n_1d_1$ represents an optical thickness of said first layer;
- $n_2d_2$ represents an optical thickness of said second layer;
- $n_3d_3$ represents an optical thickness of said third layer;
- $n_4d_4$ represents an optical thickness of said fourth layer, and
- $\lambda$ represents a design wavelength.

6. An antireflection coating as claimed in claim 5, wherein the refractive index of said first layer is larger than 1.35, the optical thickness thereof is 0.25$\lambda$, and the total optical thickness of said second to fourth layers is 0.25$\lambda$ when $\lambda$ represents a design wavelength.

7. An antireflection coating as claimed in claim 5, wherein the refractive index of said first layer is less than 1.45, each optical thickness of said first and second layers is 0.25$\lambda$, and the total optical thickness of said third and fourth layers is 0.10$\lambda$ where $\lambda$ represents a design wavelength.

8. An antireflection coating as claimed in claim 2, wherein said substrate is made of germanium (Ge) and said multilayered coating consists of, from the air side, said first layer, a second layer, a third layer, and a fourth layer as the last layer, and said multilayered coating fulfills the following conditions:

$$0.19\lambda < n_1d_1 < 0.26\lambda$$

$$0.13\lambda < n_2d_2 < 0.28\lambda$$

$$0.02\lambda < n_3d_3 < 0.11\lambda$$

$$0.02\lambda < n_4d_4 < 0.03\lambda$$

wherein:
- $n_1d_1$ represents an optical thickness of said first layer;
- $n_2d_2$ represents an optical thickness of said second layer;
- $n_3d_3$ represents an optical thickness of said third layer;
- $n_4d_4$ represents an optical thickness of said fourth layer, and
- $\lambda$ represents a design wavelength.

9. An antireflection coating as claimed in claim 8, wherein the refractive index of said first layer is larger than 1.35, the optical thickness thereof is and the total optical thickness of said second to fourth layers is 0.25$\lambda$ when $\lambda$ represents a design wavelength.

10. An antireflection coating as claimed in claim 8, wherein the refractive index of said first layer is less than 14.5, each optical thickness of said first and second layers is 0.25$\lambda$, and the total optical thickness of said third and fourth layers is 0.10$\lambda$ when $\lambda$ represents a design wavelength.

11. An antireflection coating for infrared light, comprising:
- a substrate made of a material selected from a group consisting of silicon (Si) and germanium (Ge), and
- a multilayered interference coating, formed on said substrate, consisting of a plurality of layers counted from the air side, the first layer being made of fluoride, the even numbered layer being made of zinc sulfide (ZnS), the odd numbered layer being made of a material selected from a group consisting of germanium (Ge) and yttrium fluoride (YF$_3$), and the last layer formed contiguously to said substrate being made of silicon dioxide (SiO$_2$).

12. An antireflection coating as claimed in claim 11, wherein a layer, formed contiguously to said last layer, is made of germanium (Ge).

13. An antireflection coating as claimed in claim 11, wherein the odd numbered layer is made of germanium (Ge).

14. An improved multilayer antireflection coating for infrared light, comprising:
- a substrate transmissive to a predetermined design wavelength of infrared radiation;
- a layer of silicon dioxide of a predetermined optical thickness sufficient to improve adhesion of subsequent coating layers without significantly absorbing the design wavelength of infrared radiation formed across the substrate; and
- a plurality of coating layers coated above the layer of silicon dioxide, a ratio of the optical thickness of a final coating layer in the antireflection coating design to the optical thickness of the layer of silicon dioxide within the following range:

$$5.5 \lesssim \frac{nd \text{ (final layer)}}{nd \text{ (SiO}_2 \text{ layer)}} \lesssim 11$$

15. An antireflection coating for infrared light, comprising:
- a substrate made of a material selected from a group consisting of silicon (Si) and germanium (Ge), and
- a multi-layered coating, formed on said substrate consisting of a plurality of layers counted from the air side, the first layer being made of fluoride, the second layer being made of zinc sulfide (ZnS), and the last layer formed contiguously to said substrate being made of silicon dioxide (SiO$_2$).

16. An antireflection coating as claimed in claim 15, wherein a layer formed contiguously to said last layer is made of germanium (Ge).

* * * * *